United States Patent
Chono

(10) Patent No.: US 8,290,064 B2
(45) Date of Patent: Oct. 16, 2012

(54) INTRA-FORECAST MODE SELECTING METHOD, MOVING PICTURE CODING METHOD, AND DEVICE AND PROGRAM USING THE SAME

(75) Inventor: Keiichi Chono, Tokyo (JP)

(73) Assignee: NEC Corporation, Tokyo (JP)

( * ) Notice: Subject to any disclaimer, the term of this patent is extended or adjusted under 35 U.S.C. 154(b) by 1072 days.

(21) Appl. No.: 12/282,338

(22) PCT Filed: Mar. 9, 2007

(86) PCT No.: PCT/JP2007/054631
§ 371 (c)(1),
(2), (4) Date: Sep. 9, 2008

(87) PCT Pub. No.: WO2007/105614
PCT Pub. Date: Sep. 20, 2007

(65) Prior Publication Data
US 2009/0034632 A1     Feb. 5, 2009

(30) Foreign Application Priority Data
Mar. 10, 2006  (JP) ................. 2006-065034

(51) Int. Cl.
*H04N 7/12*     (2006.01)
(52) U.S. Cl. .............. 375/240.27; 375/240.26
(58) Field of Classification Search ............ 375/240.02–240.06, 240.12–240.16, 240.26, 240.27
See application file for complete search history.

(56) References Cited

U.S. PATENT DOCUMENTS

2003/0108102 A1   6/2003   Demos
2004/0086049 A1 * 5/2004   Yoneyama ............... 375/240.25

OTHER PUBLICATIONS

Kei-Ichi Chono and Yoshihiro Miyamoto, An Enhanced Mode Descion to Surpress Coding Artifacts in H.264 Encoding, FIT2006, Media and Information Research Laboratories, NEC Corportaion.
Bojun Meng et al., "Efficient Intra-Prediction Mode Selection for 4×4 Blocks in H.264", vol. 3, Jul. 6, 2003, XP010650357, ISBN: 978-0-7803-7965-7, pp. 521-524.
Joint Video Team, "Text Description of Joint Model Reference Encoding Methods and Decoding Concealment Methods", Mar. 19, 2004, XP030005859, pp. 1-40.
Supplementary European Search Report dated Sep. 28, 2011 issued by the European Patent Office in counterpart European Patent Application No. 07738116.8.

* cited by examiner

*Primary Examiner* — Gilberto Barron, Jr.
*Assistant Examiner* — Malcom Cribbs
(74) *Attorney, Agent, or Firm* — Sughrue Mion, PLLC

(57) ABSTRACT

An intra-forecast mode selecting method is provided to select an intra-forecast mode suitable for intra-forecast coding of a coding subject block from intra-forecast modes including a DC intra-forecasting mode based on a difference in forecast between a coding amount of the intra-forecast mode and an intra-forecast. The intra-forecast mode selecting method is comprised of intra-forecast mode selecting means for correcting the coding amount of the DC intra-forecast mode to be equal to that of the other intra-forecast or less to select an intra-forecast mode based on a difference in forecast between the coding amount of the corrected DC intra-forecast and the intra-forecast.

18 Claims, 12 Drawing Sheets

FIG. 4

- • 4x4 BLOCK FOR WHICH DC IS SELECTED
- V 4x4 BLOCK FOR WHICH V IS SELECTED
- H 4x4 BLOCK FOR WHICH H IS SELECTED
- | 4x4 BLOCK FOR WHICH A FORECASTED MODE V IS SELECTED
- − 4x4 BLOCK FOR WHICH A FORECASTED MODE H IS SELECTED

- •   4x4 BLOCK FOR WHICH DC IS SELECTED
- V   4x4 BLOCK FOR WHICH V IS SELECTED
- H   4x4 BLOCK FOR WHICH H IS SELECTED
- *   4x4 BLOCK FOR WHICH DC IS SELECTED ACCORDING TO THE INVENTION

```
. . . . . . . . . . . . . . . . . . . . .
. . . . . . . . . . . . . . .h*.v*. .
. . . . . . . . .h*v*. .*.h*. . .
. . . . . . . . .*.h*. . . .*v*. .
. . . . . . .h*.v*. . . . . .*. . .
. . . . .v**. .*. . . . . . . . . .
. . . . .*. . . . . . .v*. . . . . .
. . . . . . . . . . . .*. . .h*. . .
. . . . . . . . . . . . . . .*. . . .
. . . . . . . . . . . . . . . . . . .
. . . . . . . . . . . . .h*. . . . . .
. . . . . . . . . . . . .*. . . . .h*.
. . . . . . . . . . . . . .v**. .
.h*. . . . . . . . . . . . . .*. . .v
.*. . . . . . . . .h*. . . . . . . .v
```

INTRA-FORECAST MODE SELECTING METHOD, MOVING PICTURE CODING METHOD, AND DEVICE AND PROGRAM USING THE SAME

TECHNICAL FIELD

The present invention relates to an intra-forecast mode selecting method and moving picture coding in a moving picture coding technique using intra-forecast, and is suitably applicable to apparatus and program using the same.

BACKGROUND ART

A moving picture coding scheme with a high compression rate is ISO/IEC 14496-10 Advanced Video Coding (Non-patent Document 1: ISO/IEC 14496-10 Advanced Video Coding).

A moving picture coding apparatus using the above-described AVC applies coding processing to Macro Blocks (MB's) one by one in each input image frame to generate encoded data, i.e., bit stream. As used herein, an MB refers to a cell of an input image frame divided in a grid-like manner, the cell containing 16×16 luminance pixels and 8×8 Cr—Cb chrominance pixels (FIG. 1). In a case that input data is interlaced, the structure of an image frame is divided into a first field and a second field, and each field serves as an image frame subjected to coding processing.

According to AVC, intra-forecast coding can be applied to a 4×4 unitary block at minimum, which is obtained by sub-dividing an MB. In intra-forecast coding according to AVC, encoding may be achieved by selecting an intra-forecast mode that is suitable for intra-forecast coding of a current block from among a plurality of intra-forecast modes (candidate intra-forecast modes ($c\_intra\_mode[i]$ ($0 \leq i \leq 8$))).

FIG. 2 shows an intra-forecast mode selecting apparatus (which will be referred to as a conventional intra-forecast mode selecting apparatus hereinbelow) for selecting an intra-forecast mode for a 4×4 block suitable for intra-forecast coding. The conventional intra-forecast mode selecting apparatus is comprised of a controller P10001, an intra-forecast apparatus P10002, an SATD calculating apparatus P10003, a header cost calculating apparatus P10004, an intra-forecast mode forecasting apparatus P10005, and a selecting apparatus P10006.

The controller P10001 supplies a candidate intra-forecast mode ($c\_intra\_mode[i]$) for a 4×4 block of interest to the intra-forecast apparatus P10002 and header cost calculating apparatus P10004.

Referring to FIG. 3, AVC has nine candidate intra-forecast modes. A DC intra-forecast mode (Mode=2) produces a forecasted image with an average value of already-encoded surrounding pixels, while other intra-forecast modes (Mode=2) produce a forecasted image by padding already-encoded surrounding pixels in a specific direction.

The intra-forecast apparatus P10002 produces an intra-forecasted image pred corresponding to the supplied candidate intra-forecast mode $c\_intra\_mode[i]$ from an already-encoded reconstructed image.

The SATD calculating apparatus P10003 is supplied with a forecast difference diff (EQ. (1)) obtained by subtracting the intra-forecasted image pred from an original image org for the 4×4 block of interest:

$$\text{diff}(i,j) = \text{org}(i,j) - \text{pred}(i,j) \tag{1}$$

The SATD calculating apparatus P10003 applies Hadamard transform to the above-described forecast difference diff (EQ. (2)), and calculates for outputting a total sum SATD of the absolute values of the coefficients of Hadamard transform (EQ. (3)).

$$Tdiff = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} \text{diff}_{00} & \text{diff}_{01} & \text{diff}_{02} & \text{diff}_{03} \\ \text{diff}_{10} & \text{diff}_{11} & \text{diff}_{12} & \text{diff}_{13} \\ \text{diff}_{20} & \text{diff}_{21} & \text{diff}_{22} & \text{diff}_{23} \\ \text{diff}_{30} & \text{diff}_{31} & \text{diff}_{32} & \text{diff}_{33} \end{bmatrix} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \tag{2}$$

$$SATD = 0.5 \times \sum_{x=0}^{3} \sum_{y=0}^{3} |Tdiff(x,y)| \tag{3}$$

On the other hand, the intra-forecast mode forecasting apparatus P10005 forecasts an intra-forecast mode for the 4×4 block of interest from the intra-forecast mode for an already-encoded 4×4 block adjacent thereto, as given by EQ. (4). As used hereinbelow, the intra-forecast mode that is forecasted is represented as a forecasted intra-forecast mode ($p\_intra\_mode$).

$$p\_intra\_mode = \begin{cases} DC & \text{if (the block of interest lies at the boundary frames or slices)} \\ \min(intra\_mode\_A, intra\_mode\_B) & \text{Otherwise} \end{cases} \tag{4}$$

where $intra\_mode\_A$ designates an intra-forecast mode for a block left adjacent to the block of interest, and $intra\_mode\_B$ designates an intra-forecast mode for a block upwardly adjacent to the block of interest. Since intra_mode is defined as given in TABLE 1 according to AVC, an intra-frame forecast direction having the smaller number is selected from among adjacent blocks. In coding in the intra-forecast mode according to AVC, if the intra-forecast mode (intra_mode) is the same as the forecasted intra-forecast mode (p_intra_mode), one bit of prev_intra4x4_pred_mode_flag (which will be abbreviated as prev_intra_mode_flag hereinbelow) (a total of one bit) is transmitted; otherwise, one bit of prev_intra_mode_flag and three bits of rem_intra4x4_pred_mode (which will be abbreviated as rem_intra_mode hereinbelow) (a total of four bits) are transmitted (see Non-patent Document 1: ISO/IEC 14496-10 Advanced Video Coding for further information).

TABLE 1

| intra_mode | Intra-frame forecast direction |
|---|---|
| 0 | Vertical (V) |
| 1 | Horizontal (H) |
| 2 | DC |
| 3 | 45° |

TABLE 1-continued

| intra_mode | Intra-frame forecast direction |
|---|---|
| 4 | −45° |
| 5 | −22.5° |
| 6 | −67.5° |
| 7 | 22.5° |
| 8 | −112.5 |

The forecasted intra-forecast mode (p_intra_mode) is supplied to the header cost calculating apparatus P10004.

When the candidate intra-forecast mode (c_intra_mode[i]) supplied by the controller P10001 is the same as the forecasted intra-forecast mode (p_intra_mode) supplied by the intra-forecast mode forecasting apparatus P10005, the header cost calculating apparatus P10004 outputs an output value of the first cost calculation (EQ. (5)) as a header cost.

$$\text{header\_cost} = 2^{(QP-12)/6} \times \text{Bits}(\text{prev\_intra\_mode\_flag}) \quad (5)$$
$$= 2^{(QP-12)/6}$$

Otherwise (i.e., when c_intra_mode[i] is not the same as p_intra_mode), the header cost calculating apparatus P10004 outputs an output value of the second cost calculation (EQ. (6)) as a header cost.

$$\text{header\_cost} = 2^{(QP-12)/6} \times \{\text{Bits}(\text{prev\_intra\_mode\_flag}) + \quad (6)$$
$$\text{Bits}(\text{rem\_intra\_mode})\}$$
$$= 4 \times 2^{(QP-12)/16}$$

where QP designates a quantization parameter of the current MB, and Bits(x) is a function that returns the number of bits of a symbol x.

The selecting apparatus P10006 is input with a sum of the SATD supplied by the SATD calculating apparatus P10003 and the header cost supplied by the header cost calculating apparatus P10004 (EQ. (7)). The sum will be referred to as a cost of a candidate intra-forecast mode.

$$\text{cost}=\text{SATD}+\text{header\_cost} \quad (7)$$

When the supplied cost is smaller than the minimum cost (min_cost) calculated for the 4×4 block of interest in the past, the selecting apparatus P10006 sets the candidate intra-forecast mode (c_intra_mode[i]) to the intra-forecast mode (intra_mode) for the 4×4 block of interest, and moreover, updates the minimum cost (min_cost) with cost.

The conventional intra-forecast mode selecting apparatus can apply the aforementioned processing to each candidate intra-forecast mode (c_intra_mode[i]) for a 4×4 block of interest one by one to thereby select an intra-forecast mode for the 4×4 block of interest.

It should be noted that the total sum (mb_cost) (EQ. (8)) of the cost for each 4×4 block in an MB is employed for MB-mode decision in the outside.

$$\text{mb\_cost} = \sum_{iidx=0}^{15} \text{cost}(idx) \quad (8)$$

where idx designates a number corresponding to each 4×4 block within the MB shown in FIG. 1.

The explanation of the prior arts has now been completed.

Non-patent Document 1: ISO/IEC 14496-10 Advanced Video Coding.

Non-patent Document 2: Ryuichi TANIDA, Atsushi SHIMIZU, Kazuto KAMIKURA, and Yoshiyuki YASHIMA, "Verification of the algorithm for suppression of line-shaped noise on H.264/MPEG-4 AVC," Proceedings of the IEICE General Conference, D-11-38 (2004).

DISCLOSURE OF THE INVENTION

Problems to be Solved by the Invention

It has been pointed out that in low-bit-rate moving picture coding, use of the conventional intra-forecast mode selection causes line-shaped noise to be generated within an MB because a vertical (V) or horizontal (H) intra-forecast mode that is likely to give a smaller header cost is selected.

To avoid such a problem, Non-patent Document 2 proposes a method comprising deciding whether linear noise should be generated by a selected intra-forecast mode, and if it is decided that linear noise should be generated, selecting an intra-forecast mode that minimizes the forecast error, instead of the sum of the forecast error and header cost (cost in EQ. (7)), to thereby avoid line-shaped noise that would be otherwise generated within an MB.

Non-patent Document 2, however, poses a problem that computational complexity is increased due to the decision as to whether linear noise should be generated. It also poses a problem that, in a case that a threshold for deciding generation of linear noise does not match the property of an input image, linear noise cannot be avoided.

Moreover, Non-patent Document 2 does not fully take account of another problem of image quality degradation, that is, a subjectively undesirable intra-forecast mode propagates over a picture plane. FIG. 4 shows a case in which a subjectively undesirable intra-forecast mode propagates over a picture plane for a flat image frame.

The propagation over a picture plane of the subjectively undesirable intra-forecast mode is caused by the fact that under the constraint by EQ. (4) and TABLE 1, the V or H intra-forecast mode that has a smaller number of intra_mode is selected with higher priority than the DC intra-forecast mode even for a flat block. Once V or H is selected as the intra-forecast mode, the V or H intra-forecast mode propagates into a subsequent flat image region (a region in which the DC intra-forecast mode is subjectively desirable) (v propagates as "|" and h propagates as "-"). As a result, a flat image region will have artificial texture that does not exist in the original image.

The present invention has therefore been made in light of these problems, and its object is to provide an intra-forecast mode selecting technique capable of avoiding linear noise while eliminating the need for calculation of deciding whether linear noise should be generated, and moreover, capable of avoiding propagation over a picture plane of a subjectively undesirable intra-forecast mode.

Means to Solve the Problem

The 1st invention for solving the above-mentioned problems, which is an intra-forecast mode selecting method of selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, characterized in that a coding amount of the DC intra-forecast mode is corrected to be no greater than those of other intra-forecast modes, and an intra-forecast mode is selected based on said corrected coding amount of the DC intra-forecast mode and the forecast difference in intra-forecast.

The 2nd invention for solving the above-mentioned problems is characterized in that, in the above-mentioned 1st invention, it is decided whether an intra-forecast mode forecasted from an intra-forecast mode of an already-encoded block adjacent to the current block is an intra-forecast mode predetermined to be selected with higher priority than the DC intra-forecast mode, and said correction is performed only in a case that said forecasted intra-forecast mode is decided to be the intra-forecast mode predetermined to be selected with higher priority than the DC intra-forecast mode.

The 3rd invention for solving the above-mentioned problems is characterized in that, in the above-mentioned 1st or 2nd inventions, after selecting an intra-forecast mode for the current block, when the selected intra-forecast mode is the DC intra-forecast mode, said corrected coding amount of the DC intra-forecast mode is re-corrected with the coding amount of the DC intra-forecast mode.

The 4th invention for solving the above-mentioned problems is characterized in that a moving picture coding method using an intra-forecast mode selecting method of selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, characterized in that a coding amount of the DC intra-forecast mode is corrected to be no greater than those of other intra-forecast modes, and an intra-forecast mode is selected based on said corrected coding amount of the DC intra-forecast mode and the forecast difference in intra-forecast.

The 5th invention for solving the above-mentioned problems is characterized in that, in the above-mentioned 4th invention, it is decided whether an intra-forecast mode forecasted from an intra-forecast mode of an already-encoded block adjacent to the current block is an intra-forecast mode predetermined to be selected with higher priority than the DC intra-forecast mode, and said correction is performed only in a case that said forecasted intra-forecast mode is decided to be the intra-forecast mode predetermined to be selected with higher priority than the DC intra-forecast mode.

The 6th invention for solving the above-mentioned problems is characterized in that, in the above-mentioned 4th or 5th inventions, after selecting an intra-forecast mode for the current block, when the selected intra-forecast mode is the DC intra-forecast mode, said corrected coding amount of the DC intra-forecast mode is re-corrected with the coding amount of the DC intra-forecast mode.

The 7th invention for solving the above-mentioned problems is characterized in that an intra-forecast mode selecting apparatus for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, characterized in that the apparatus comprises intra-forecast mode selecting means for correcting a coding amount of the DC intra-forecast mode to be no greater than those of other intra-forecast modes, and selecting an intra-forecast mode based on said corrected coding amount of the DC intra-forecast mode and the forecast difference in intra-forecast.

The 8th invention for solving the above-mentioned problems is characterized in that, in the above-mentioned 7th invention, said intra-forecast mode selecting means comprises: means for deciding whether an intra-forecast mode forecasted from an intra-forecast mode of an already-encoded block adjacent to the current block is an intra-forecast mode predetermined to be selected with higher priority than the DC intra-forecast mode; and means for performing said correction only in a case that said forecasted intra-forecast mode is decided to be the intra-forecast mode predetermined to be selected with higher priority than the DC intra-forecast mode.

The 9th invention for solving the above-mentioned problems is characterized in that, in the above-mentioned 7th or 8th inventions, after selecting an intra-forecast mode for the current block, when the selected intra-forecast mode is the DC intra-forecast mode, said intra-forecast mode selecting means re-corrects said corrected coding amount of the DC intra-forecast mode with the coding amount of the DC intra-forecast mode.

The 10th invention for solving the above-mentioned problems is characterized in that a moving picture coding apparatus comprising an intra-forecast mode selecting apparatus for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, characterized in that the apparatus comprises intra-forecast mode selecting means for correcting a coding amount of the DC intra-forecast mode to be no greater than those of other intra-forecast modes, and selecting an intra-forecast mode based on said corrected coding amount of the DC intra-forecast mode and the forecast difference in intra-forecast.

The 11th invention for solving the above-mentioned problems is characterized in that, in the above-mentioned 10th invention, a moving picture coding apparatus according to claim 10, characterized in that said intra-forecast mode selecting means comprises: means for deciding whether an intra-forecast mode forecasted from an intra-forecast mode of an already-encoded block adjacent to the current block is an intra-forecast mode predetermined to be selected with higher priority than the DC intra-forecast mode; and means for performing said correction only in a case that said forecasted intra-forecast mode is decided to be the intra-forecast mode predetermined to be selected with higher priority than the DC intra-forecast mode.

The 12th invention for solving the above-mentioned problems is characterized in that, in the above-mentioned 10th or 11th inventions, after selecting an intra-forecast mode for the current block, when the selected intra-forecast mode is the DC intra-forecast mode, said intra-forecast mode selecting means re-corrects said corrected coding amount of the DC intra-forecast mode with the coding amount of the DC intra-forecast mode.

The 13th invention for solving the above-mentioned problems is characterized in that a program for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, characterized in that said program causes an information processing apparatus to execute the processing of correcting a coding amount of the DC intra-forecast mode to be no greater than those of other intra-forecast modes, and selecting an intra-forecast mode based on said corrected coding amount of the DC intra-forecast mode and the forecast difference in intra-forecast.

The 14th invention for solving the above-mentioned problems is characterized in that, in the above-mentioned 13th invention, said program causes the information processing apparatus to execute the processing of:

deciding whether an intra-forecast mode forecasted from an intra-forecast mode of an already-encoded block adjacent to the current block is an intra-forecast mode predetermined to be selected with higher priority than the DC intra-forecast mode; and performing said correction only in a case that said forecasted intra-forecast mode is decided to be the intra-forecast mode predetermined to be selected with higher priority than the DC intra-forecast mode.

The 15th invention for solving the above-mentioned problems is characterized in that, in the above-mentioned 13th or 14th inventions, said program causes the information processing apparatus to execute the processing of, after selecting an intra-forecast mode for the current block, when the selected intra-forecast mode is the DC intra-forecast mode, re-correcting said corrected coding amount of the DC intra-forecast mode with the coding amount of the DC intra-forecast mode.

The 16th invention for solving the above-mentioned problems is characterized in that a moving picture coding program for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, characterized in that said program causes an information processing apparatus to execute the processing of correcting a coding amount of the DC intra-forecast mode to be no greater than those of other intra-forecast modes, and selecting an intra-forecast mode based on said corrected coding amount of the DC intra-forecast mode and the forecast difference in intra-forecast.

The 17th invention for solving the above-mentioned problems is characterized in that, in the above-mentioned 16th invention, said program causes the information processing apparatus to execute the processing of: deciding whether an intra-forecast mode forecasted from an intra-forecast mode of an already-encoded block adjacent to the current block is an intra-forecast mode predetermined to be selected with higher priority than the DC intra-forecast mode; and performing said correction only in a case that said forecasted intra-forecast mode is decided to be the intra-forecast mode predetermined to be selected with higher priority than the DC intra-forecast mode.

The 18th invention for solving the above-mentioned problems is characterized in that, in the above-mentioned 16th or 17th inventions, said program causes the information processing apparatus to execute the processing of, after selecting an intra-forecast mode for the current block, when the selected intra-forecast mode is the DC intra-forecast mode, re-correcting said corrected coding amount of the DC intra-forecast mode with the coding amount of the DC intra-forecast mode.

Effects of the Invention

According to the present invention, there are provided an intra-forecast mode selecting method, and apparatus and program using the same capable of avoiding propagation over a picture plane of a subjectively undesirable intra-forecast mode without significantly increasing the number of bits for an intra-forecast mode.

BRIEF DESCRIPTION OF THE DRAWINGS

FIG. 4 is a diagram for explaining propagation over a picture plane of a subjectively undesirable intra-forecast mode.

FIG. 7 shows selection of a subjectively desirable intra-forecast mode according to the invention.

EXPLANATION OF SYMBOLS

P10001 Controller
P10002 Intra-forecast apparatus
P10003 SATD calculating apparatus
P10004 Header cost calculating apparatus
P10005 Intra-forecast mode forecasting apparatus

BEST MODES FOR CARRYING OUT THE INVENTION

First Embodiment of the Present Invention

The invention of this embodiment includes, as compared with the prior arts, means for selecting an intra-forecast mode after correcting (calculating) a coding amount of the DC intra-forecast mode to be no greater than those of other intra-forecast modes. Thus, the DC intra-forecast mode is likely to be selected for a flat block with higher probability, thus overcoming the aforementioned problems.

A configuration of an intra-forecast mode selecting apparatus according to the invention of this embodiment will be described with reference to FIG. 5.

Figure 1:
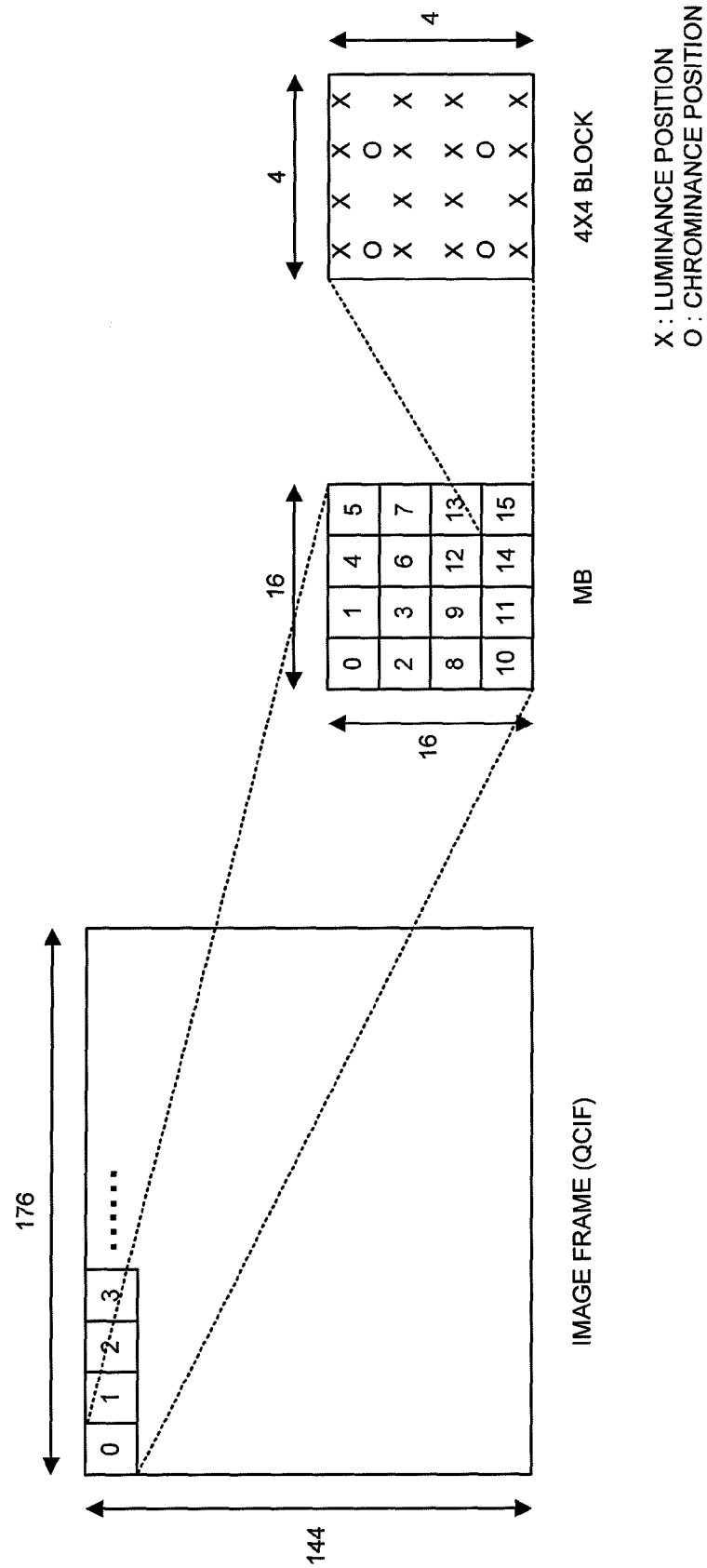
FIG. 1 shows a configuration of an image frame (in a 4:2:0 format).
Figure 2:
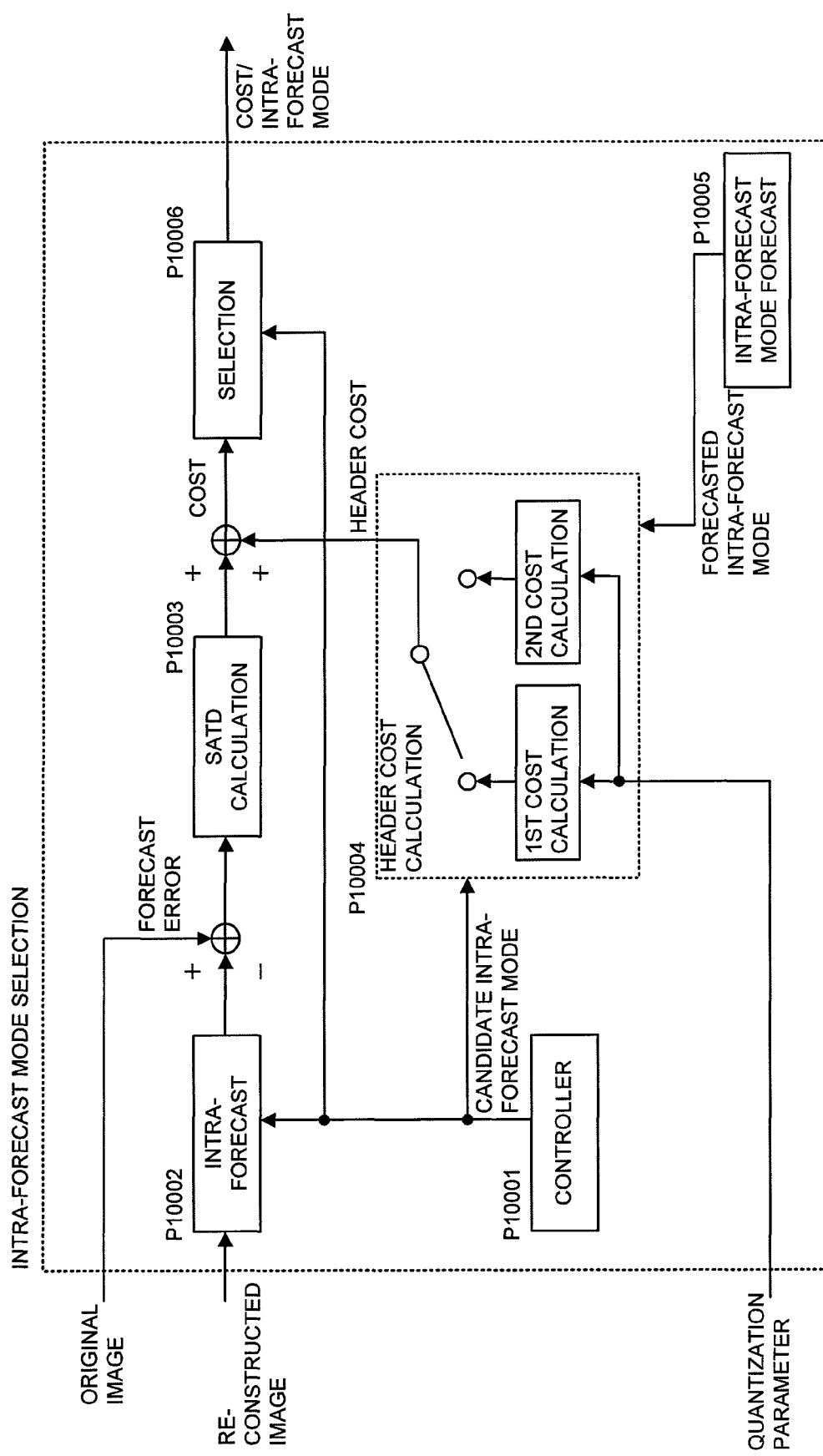
FIG. 2 shows a configuration of an intra-forecast mode selecting apparatus.
Figure 3:
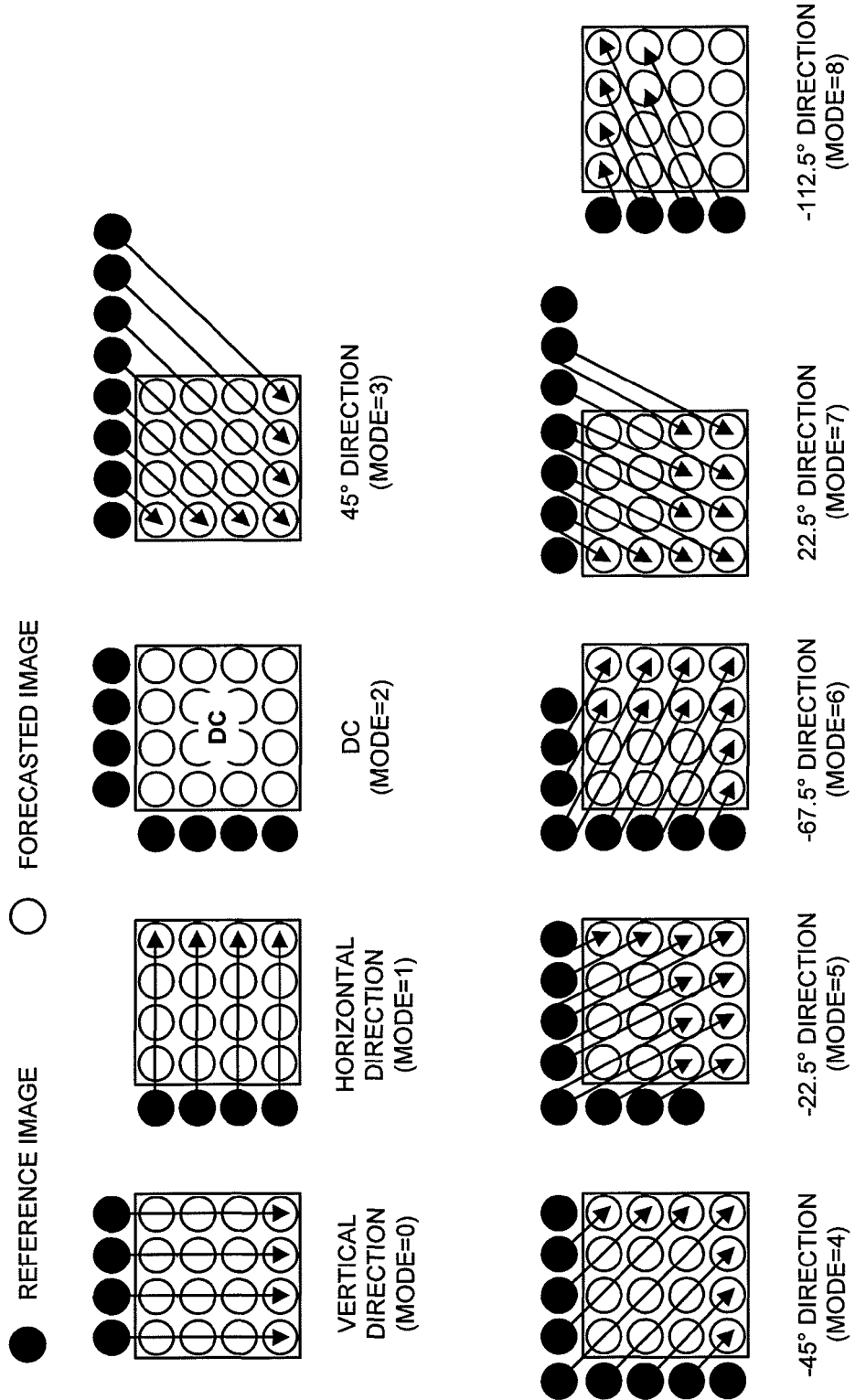
FIG. 3 shows correspondence between an intra-forecast mode Mode (designated as intra_mode herein) and a forecasted image according to AVC.

As compared with the conventional intra-forecast mode selecting apparatus in FIG. 2, it can be seen that the intra-forecast mode selecting apparatus of the invention is different only in the header cost calculating apparatus P10004 from the conventional apparatus. The following description will address the header cost calculating apparatus P10004, which is a characteristic portion of the invention.

When the candidate intra-forecast mode (c_intra_mode[i]) supplied by the controller P10001 is DC, the header cost calculating apparatus P10004 of the invention outputs an output value of third cost calculation (EQ. (9)) as a header cost.

$$\text{header\_cost} = 2^{(QP-12)/6} \times \text{Bits(prev\_intra\_mode\_flag)} \quad (9)$$
$$= 2^{(QP-12)/6}$$

When the candidate intra-forecast mode (c_intra_mode[i]) is not DC, and c_intra_mode[i] is the same as the forecasted intra-forecast mode (p_intra_mode) supplied by the intra-forecast mode forecasting apparatus P10005, the header cost calculating apparatus P10004 of the invention outputs an output value of the first cost calculation (EQ. (5)) as a header cost.

$$\text{header\_cost} = 2^{(QP-12)/6} \times \text{Bits(prev\_intra\_mode\_flag)} \quad (5)$$
$$= 2^{(QP-12)/6}$$

Otherwise (i.e., the candidate intra-forecast mode (c_intra_mode[i]) is not DC, and c_intra_mode[i] is not the same as the forecasted intra-forecast mode (p_intra_mode) supplied by the intra-forecast mode forecasting apparatus P10005), the header cost calculating apparatus P10004 of the invention outputs an output value of the second cost calculation (EQ. (6)) as a header cost.

$$\text{header\_cost} = 2^{(QP-12)/6} \times \{\text{Bits(prev\_intra\_mode\_flag)} + \quad (6)$$
$$\text{Bits(rem\_intra\_mode)}\}$$
$$= 4 \times 2^{(QP-12)/16}$$

Thus, a DC mode is likely to be selected for a flat block with higher probability by estimating a coding amount of an intra-forecast mode corresponding to the DC intra-forecast mode to be no greater than those of other intra-forecast modes (EQ. (9)), thus avoiding propagation over a picture plane of a subjectively undesirable intra-forecast mode. Once the DC mode is consecutively selected, the subsequent forecasted intra-forecast mode becomes DC, thus preventing the problem that the number of bits for the intra-forecast mode is extremely increased.

Figure 6:
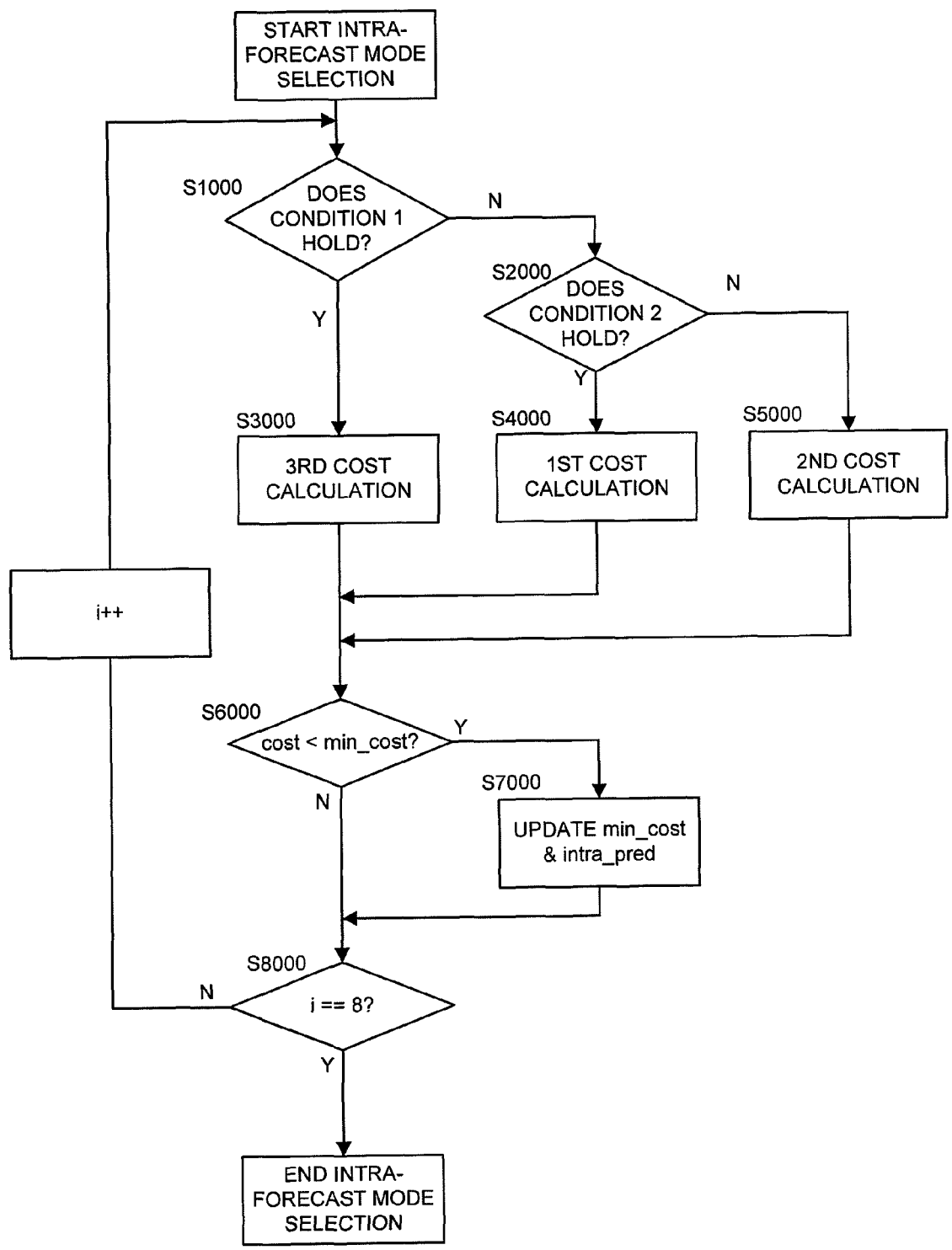
FIG. 6 shows an intra-forecast mode selection flow (first embodiment) according to the invention.

Next, an operation of the intra-forecast mode selecting apparatus according to the invention in this embodiment will be described with reference to FIG. 6.

Upon the start of intra-forecast mode selection, a mode counter i is first set to zero, and an initial value (a sufficiently large value) is set for a minimum cost (min_cost).

At Step S1000, a decision is made as to whether the candidate intra-forecast mode (c_intra_mode[i]) is DC (Condition 1). If the candidate intra-forecast mode (c_intra_mode[i]) is DC (Condition 1 holds), the flow proceeds to Step S3000; otherwise, to Step S2000.

At Step S2000, a decision is made as to whether the candidate intra-forecast mode (c_intra_mode[i]) is the same as the forecasted intra-forecast mode (p_intra_mode) (Condition 2). If they are the same (Condition 2 holds) the flow proceeds to Step S4000; otherwise, to Step S5000.

At Step S3000, a header cost is calculated according to EQ. (9) (the third cost calculation), and the flow proceeds to Step S6000.

At Step S4000, a header cost is calculated according to EQ. (5) (the first cost calculation), and the flow proceeds to Step S6000.

At Step S5000, a header cost is calculated according to EQ. (6) (the second cost calculation), and the flow proceeds to Step S6000.

At Step S6000, a cost for the candidate intra-forecast mode is calculated according to EQ. (7), and a decision is made as to whether the above-described cost is smaller than the minimum cost (min_cost). If it is smaller, the flow proceeds to Step S7000; otherwise, to Step S8000.

At Step S7000, the candidate intra-forecast mode (c_intra_mode[i]) is set to the intra-forecast mode (intra_mode) for the 4×4 block of interest, and moreover, the minimum cost (min_cost) is updated with cost. Thereafter, the flow proceeds to Step S8000.

At Step S8000, a decision is made as to whether the mode counter i is eight. If it is not eight (is less than eight), the mode counter is incremented and the flow goes to Step S1000. If it is eight, the processing is terminated.

After termination of the intra-forecast mode selection, the intra-forecast mode (intra_mode) and minimum cost (min_cost) for the 4×4 block of interest are output, and the flow proceeds to selection of an intra-forecast mode for a next 4×4 block.

The operation of the intra-forecast mode selecting apparatus according to the invention in this embodiment has thus been completed.

By using the intra-forecast mode selecting apparatus of the invention, the linear noise can be avoided without the need for additional calculation of making a decision as to whether the linear noise should be generated. Moreover, the DC intra-forecast mode is selected for a flat block, thus avoiding propagation over a picture plane of a subjectively undesirable intra-forecast mode in a flat image (FIG. 7).

While the coding amount of the DC intra-forecast mode is corrected to be no greater than those of other intra-forecast modes according to the present invention, it will be easily recognized that a similar effect can be obtained by using the coding amounts of other intra-forecast modes greater than the coding amount of the DC intra-forecast mode.

Second Embodiment of the Present Invention

The invention of this embodiment includes, as compared with that of the first embodiment, means for selecting an intra-forecast mode after correcting (calculating) a coding amount of the DC intra-forecast mode to be no greater than those of other intra-forecast modes only in a case that the intra-forecast mode forecasted for a block is an intra-forecast mode predetermined to be selected with higher priority than the DC intra-forecast mode (in a case that the forecasted intra-forecast mode is a V or H intra-forecast mode from TABLE 1). Thus, this embodiment operates to select a DC intra-forecast mode for a flat block while reducing an increase of the coding amount of intra-forecast modes as compared with the first embodiment, thus overcoming the aforementioned problems.

Figure 5:
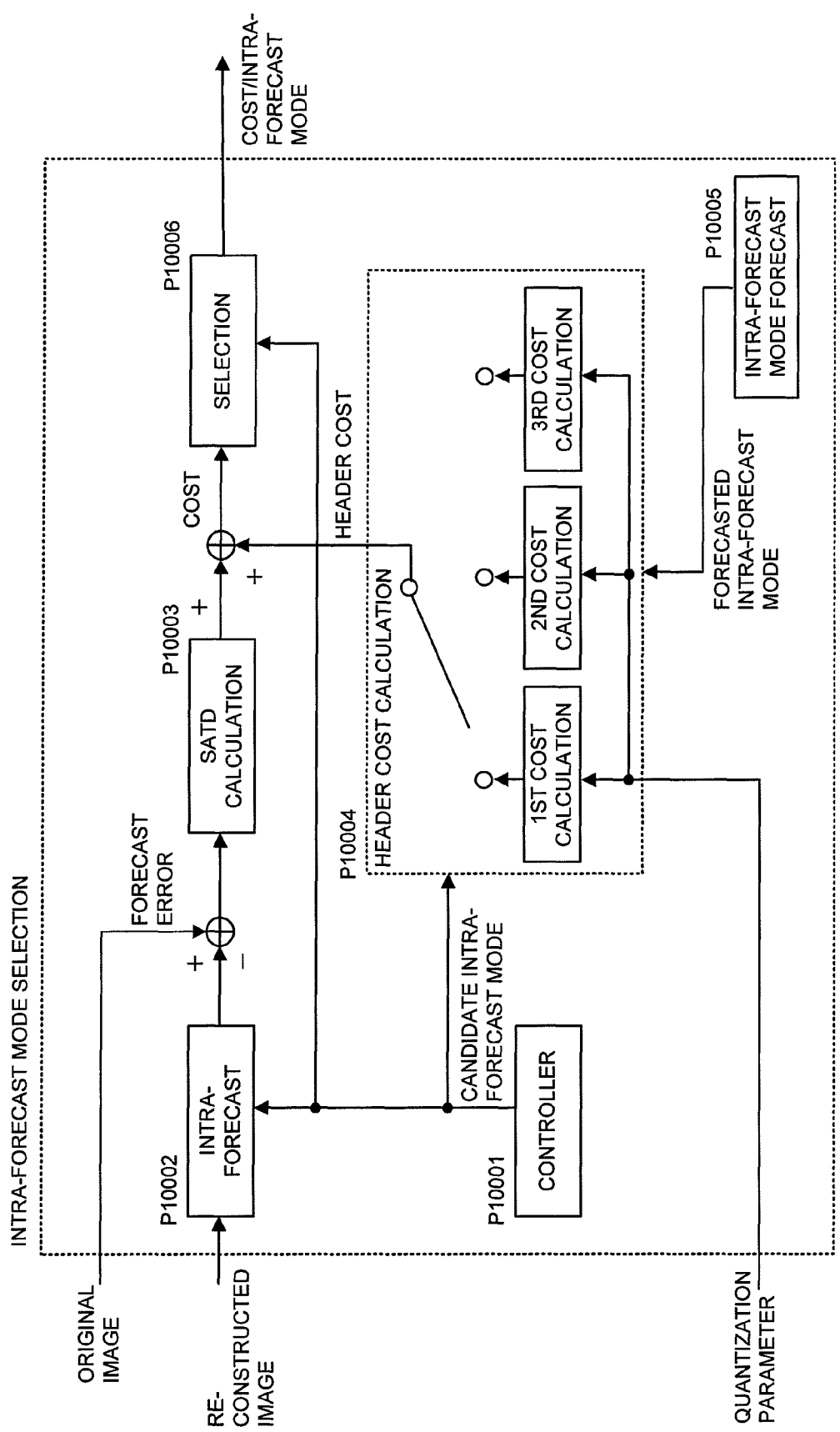
FIG. 5 shows an intra-forecast mode selecting apparatus according to the invention.

Although the configuration according to the invention of this embodiment is similar to that of the first embodiment shown in FIG. 5, the operation of the header cost calculating apparatus P10004 is somewhat different. Therefore, the following description will address the header cost calculating apparatus P10004, which is a characteristic portion in the invention of this embodiment.

When the candidate intra-forecast mode (c_intra_mode[i]) supplied by the controller P10001 is DC, and the forecasted intra-forecast mode (p_intra_mode) supplied by the intra-forecast mode forecasting apparatus P10005 is V or H, the header cost calculating apparatus P10004 of this embodiment outputs an output value of the third cost calculation (EQ. (9)) as a header cost.

$$\text{header\_cost} = 2^{(QP-12)/6} \times \text{Bits(prev\_intra\_mode\_flag)} \quad (9)$$
$$= 2^{(QP-12)/6}$$

When either a condition that the above-described candidate intra-forecast mode (c_intra_mode[i]) is not DC, or a condition that the above-described forecasted intra-forecast mode (p_intra_mode) is neither V nor H is satisfied, and when the above-described candidate intra-forecast mode (c_intra_mode[i]) is the same as the above-described forecasted intra-forecast mode (p_intra_mode), the header cost calculating apparatus P10004 of this embodiment outputs an output value of the first cost calculation (EQ. (5)) as a header cost.

$$\text{header\_cost} = 2^{(QP-12)/6} \times \text{Bits(prev\_intra\_mode\_flag)} \quad (5)$$
$$= 2^{(QP-12)/6}$$

Otherwise (i.e., either a condition that the above-described candidate intra-forecast mode (c_intra_mode[i]) is not DC, or a condition that the above-described forecasted intra-forecast mode (p_intra_mode) is neither V nor H is satisfied, and when the above-described candidate intra-forecast mode (c_intra_mode[i]) is not the same as the above-described forecasted intra-forecast mode (p_intra_mode)), the header cost calculating apparatus P10004 of this embodiment outputs an output value of the second cost calculation (EQ. (6)) as a header cost.

$$\text{header\_cost} = 2^{(QP-12)/6} \times \{\text{Bits(prev\_intra\_mode\_flag)} + \quad (6)$$
$$\text{Bits(rem\_intra\_mode)}\}$$
$$= 4 \times 2^{(QP-12)/16}$$

By thus conditionally estimate the coding amount for an intra-forecast mode corresponding to the DC intra-forecast mode to be no greater than those of other intra-forecast modes (EQ. (9)), a DC intra-forecast mode is selected for a flat block with higher probability (that is, propagation over a picture plane of a subjectively undesirable intra-forecast mode is avoided), and in addition, an increase of the number of bits for intra-forecast modes can be mitigated.

Figure 8:
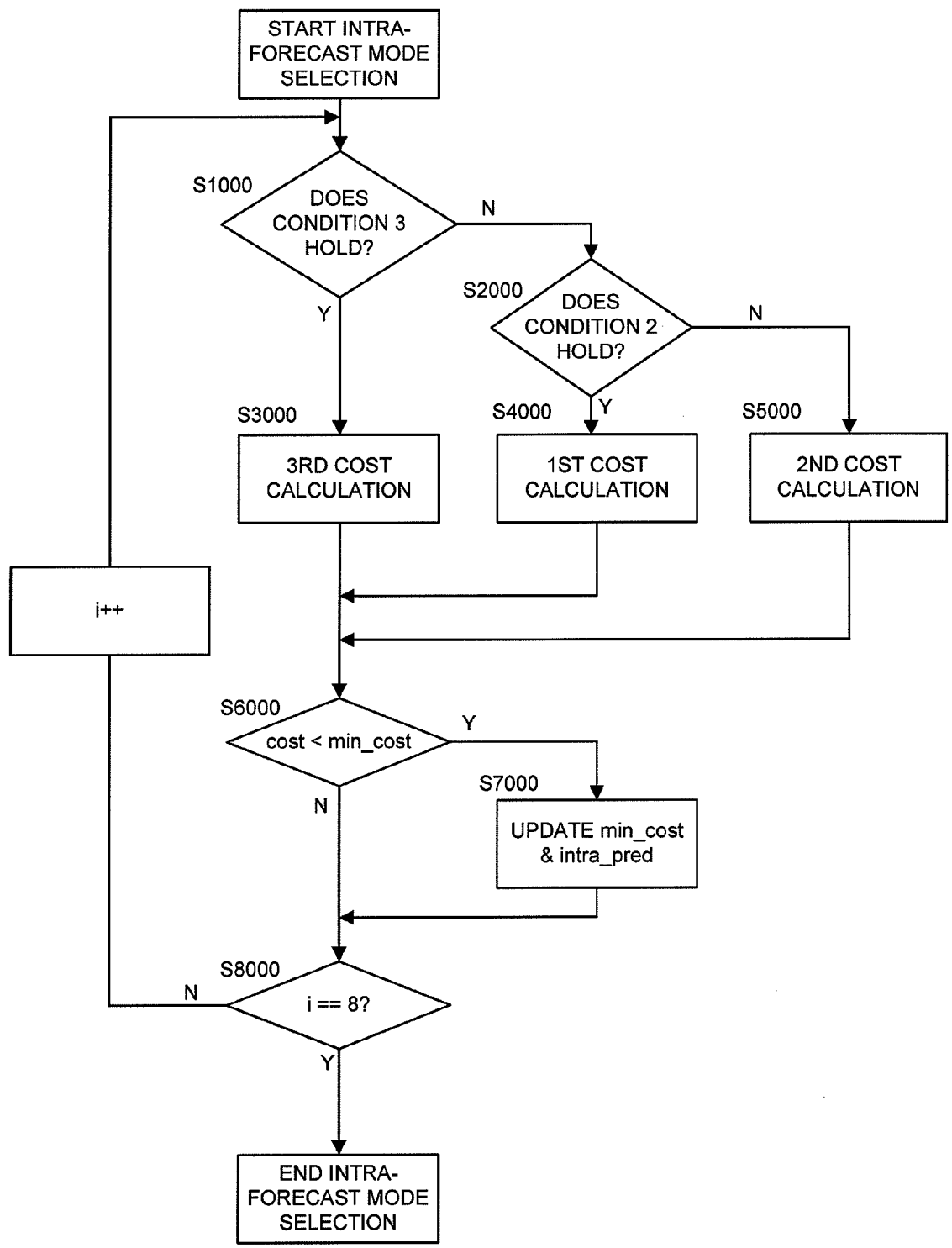
FIG. 8 shows an intra-forecast mode selection flow (the second embodiment) according to the invention.

Next, an operation of the intra-forecast mode selecting apparatus according to the invention in this embodiment will be described with reference to FIG. 8.

Upon the start of intra-forecast mode selection, a mode counter i is first set to zero, and an initial value (a sufficiently large value) is set for a minimum cost (min_cost).

At Step S1000, a decision is made as to whether the candidate intra-forecast mode (c_intra_mode[i]) is DC and the forecasted intra-forecast mode (p_intra_mode) is V or H (Condition 3). If the candidate intra-forecast mode (c_intra_mode[i]) is DC and the forecasted intra-forecast mode (p_intra_mode) is V or H (Condition 3 holds), the flow proceeds to Step S3000; otherwise, to Step S2000.

At Step S2000, a decision is made as to whether the candidate intra-forecast mode (c_intra_mode[i]) is the same as the forecasted intra-forecast mode (p_intra_mode) (Condition 2). If they are the same (Condition 2 holds), the flow proceeds to Step S4000; otherwise, to Step S5000.

At Step S3000, a header cost is calculated according to EQ. (9) (the third cost calculation), and the flow proceeds to Step S6000.

At Step S4000, a header cost is calculated according to EQ. (5) (the first cost calculation), and the flow proceeds to Step S6000.

At Step S5000, a header cost is calculated according to EQ. (6) (the second cost calculation), and the flow proceeds to Step S6000.

At Step S6000, a cost for the candidate intra-forecast mode is calculated according to EQ. (7), and a decision is made as to whether the above-described cost is smaller than the minimum cost (min_cost). If it is smaller, the flow proceeds to Step S7000; otherwise, to Step S8000.

At Step S7000, the candidate intra-forecast mode (c_intra_mode[i]) is set to the intra-forecast mode (intra_mode) for the 4×4 block of interest, and moreover, the minimum cost (min_cost) is updated with cost. Thereafter, the flow proceeds to Step S8000.

At Step S8000, a decision is made as to whether the mode counter i is eight. If it is not eight (is less than eight), the mode counter is incremented, and the flow proceeds to Step S1000. If it is eight, the processing is terminated.

After termination of the intra-forecast mode selection, the intra-forecast mode (intra_mode) and minimum cost (min_cost) for the 4×4 block of interest are output, and the flow proceeds to selection of an intra-forecast mode for a next 4×4 block.

The operation of the intra-forecast mode selecting apparatus according to the invention in this embodiment has thus been completed.

Third Embodiment of the Present Invention

The invention of this embodiment includes, as compared with that of the first embodiment and the second embodiment, means for re-correcting, when an intra-forecast mode selected for a block is DC, the above-described corrected coding amount of the DC intra-forecast mode with the coding amount of the DC intra-forecast mode. Thus, the cost for an MB used in decision of an MB-mode in the outside of the intra-forecast mode selecting apparatus becomes accurate, and an error in decision of an MB-mode due to avoidance of propagation over a picture plane of a subjectively undesirable intra-forecast mode can be prevented.

Figure 9:
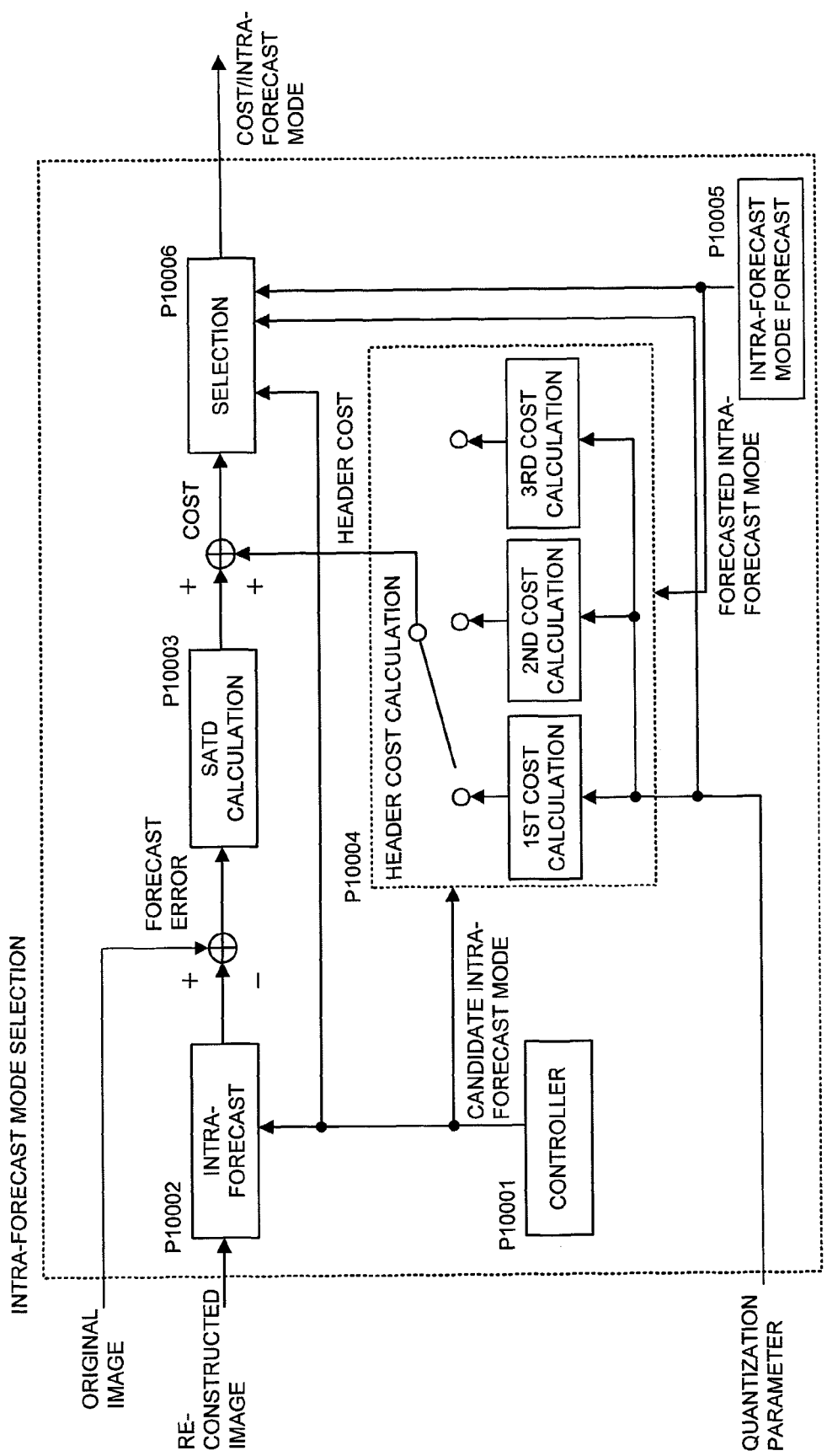
FIG. 9 shows an intra-forecast mode selecting apparatus (third embodiment) according to the invention.

An intra-forecast mode selecting apparatus according to the invention of this embodiment is shown in FIG. 9. As compared with the intra-forecast mode selecting apparatus according to the first embodiment and the second embodiment, it can be seen from FIG. 9 that an additional input is provided in the selecting apparatus P10006. The following description will address the selecting apparatus P10006, which is a characteristic portion in the invention of this embodiment.

The selecting apparatus P10006 in this embodiment is input with the candidate intra-forecast mode (c_intra_mode[i]) and cost, and in addition, the forecasted intra-forecast mode (p_intra_mode) supplied by the intra-forecast mode forecasting apparatus, and the quantization parameter QP supplied from the outside.

If the supplied cost is smaller than the minimum cost (min_cost) calculated in the past for a 4×4 block of interest, the selecting apparatus P10006 in this embodiment sets the candidate intra-forecast mode (c_intra_mode[i]) to the intra-forecast mode (intra_mode) for the 4×4 block of interest, and moreover, updates the minimum cost (min_cost) with cost.

Furthermore, after the intra-forecast mode (intra_mode) has been determined (selected) for the 4×4 block of interest from among a plurality of candidate intra-forecast modes, if the above-described selected intra-forecast mode (intra_mode) is DC and intra_mode is different from p_intra_mode, the selecting apparatus P10006 in this embodiment performs correction (re-correction) it with the coding amount of the DC intra-forecast mode that has been corrected to be no greater than those of other intra-forecast modes. That is, min_cost is re-corrected according to EQ. (10):

$$\text{min\_cost} = \begin{cases} \text{min\_cost} + 3 \times 2^{(QP-12)/6} & \text{if (intra\_mode} = \text{DC AND intra\_mode} \neq \text{p\_intra\_mode)} \\ \text{min\_cost} & \text{Otherwise} \end{cases} \quad (10)$$

Figure 10:
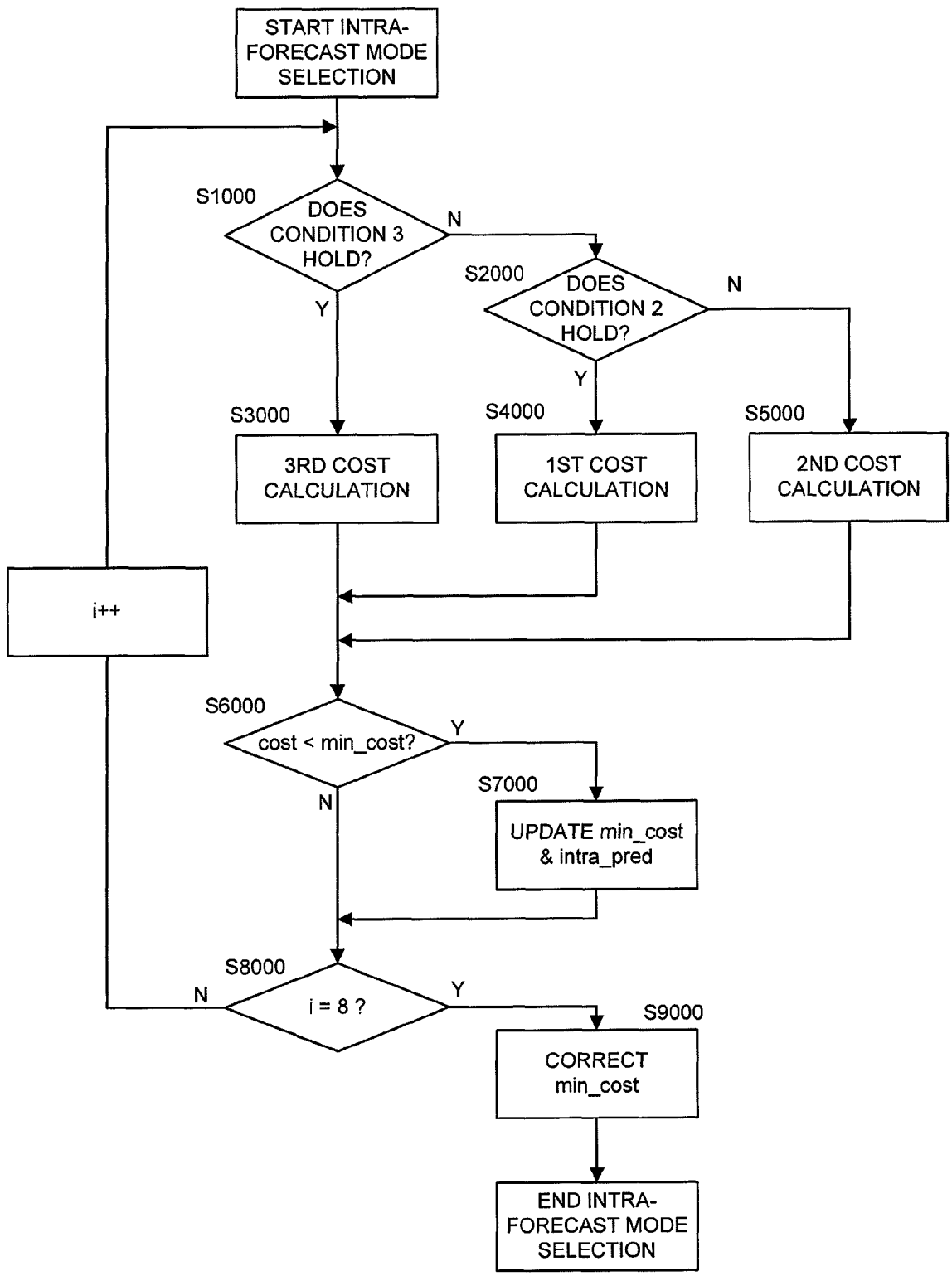
FIG. 10 shows an intra-forecast mode selection flow (third embodiment) according to the invention.

Next, an operation of the intra-forecast mode selecting apparatus according to the invention in this embodiment will be described with reference to FIG. 10.

Upon the start of intra-forecast mode selection, a mode counter i is first set to zero, and an initial value (a sufficiently large value) is set for a minimum cost (min_cost).

At Step S1000, a decision is made as to whether the candidate intra-forecast mode (c_intra_mode[i]) is DC, and the forecasted intra-forecast mode (p_intra_mode) is V or H (Condition 3). If the candidate intra-forecast mode (c_intra_mode[i]) is DC and the forecasted intra-forecast mode (p_intra_mode) is V or H (Condition 3 holds), the flow proceeds to Step S3000; otherwise, to Step S2000.

At Step S2000, a decision is made as to whether the candidate intra-forecast mode (c_intra_mode[i]) is the same as the forecasted intra-forecast mode (p_intra_mode) (Condition 2). If they are the same (Condition 2 holds) the flow proceeds to Step S4000; otherwise, to Step S5000.

At Step S3000, a header cost is calculated according to EQ. (9) (the third cost calculation), and the flow proceeds to Step S6000.

At Step S4000, a header cost is calculated according to EQ. (5) (the first cost calculation), and the flow proceeds to Step S6000.

At Step S5000, a header cost is calculated according to EQ. (6) (the second cost calculation), and the flow proceeds to Step S6000.

At Step S6000, a cost for the candidate intra-forecast mode is calculated according to EQ. (7), and a decision is made as to whether the above-described cost is smaller than the minimum cost (min_cost). If it is smaller, the flow proceeds to Step S7000; otherwise, to Step S8000.

At Step S7000, the candidate intra-forecast mode (c_intra_mode[i]) is set to the intra-forecast mode (intra_mode) for the 4×4 block of interest, and moreover, the minimum cost (min_cost) is updated with cost. Thereafter, the flow proceeds to Step S8000.

At Step S8000, a decision is made as to whether the mode counter i is eight. If it is not eight (is less than eight), the mode counter is incremented, and the flow proceeds to Step S1000. If it is eight, the flow proceeds to Step S9000.

At Step S9000, min_cost is corrected according to EQ. (10), and the processing is terminated.

After termination of the intra-forecast mode selection, the intra-forecast mode (intra_mode) and minimum cost (min_cost) for the 4×4 block of interest are output, and the flow proceeds to selection of an intra-forecast mode for a next 4×4 block.

The operation of the intra-forecast mode selecting apparatus according to the invention in this embodiment has thus been completed.

Fourth Embodiment of the Present Invention

This embodiment will address a moving picture coding apparatus according to AVC, using the intra-forecast mode selecting apparatus of the invention in the first embodiment, the second embodiment or the third embodiment.

Figure 11:
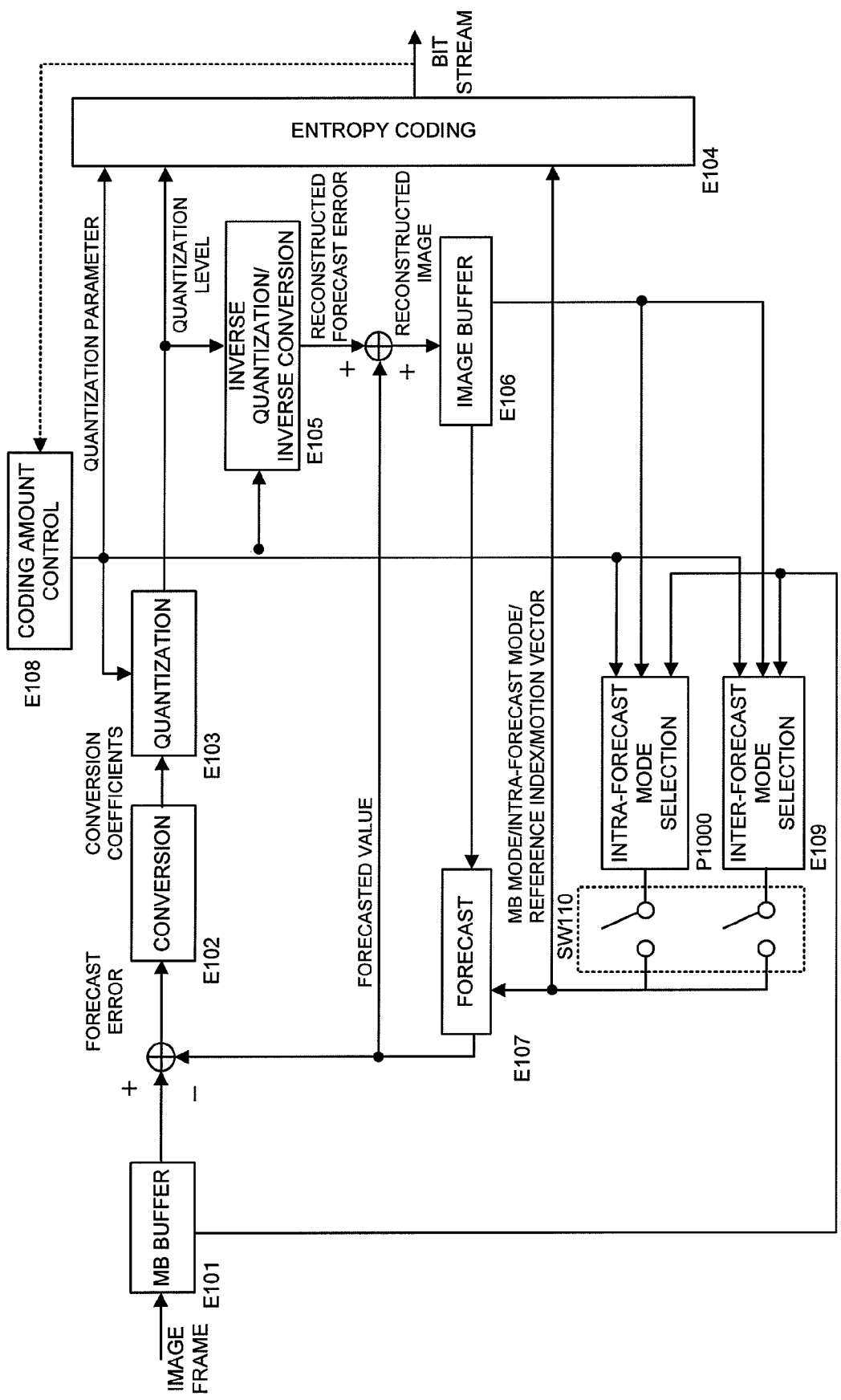
FIG. 11 shows a moving picture coding apparatus using the intra-forecast mode selecting apparatus according to the invention.

Referring to FIG. 11, the moving picture coding apparatus of the invention is comprised of an MB buffer E101, a conversion apparatus E102, a quantization apparatus E103, an entropy coding apparatus E104, an inverse quantization/inverse conversion apparatus E105, a frame buffer E106, a forecast apparatus E107, a coding amount control apparatus E108, an intra-forecast mode selecting apparatus P1000, which is a characteristic portion of the invention, and an inter-forecast mode selecting apparatus E109. These functions will be described hereinbelow.

The MB buffer E101 stores therein an original image for an MB to be encoded.

According to AVC, a forecast method that provides satisfactory encoding of an MB to be encoded is selected for encoding from among a plurality of types of forecast methods. The forecast methods are generally classified into two types: intra-forecast and inter-forecast. Intra-forecast generates a forecasted value from a reconstructed image of an image frame currently being encoded. On the other hand, inter-forecast uses for forecast a reconstructed image of any one of a plurality of image frames encoded in the past. Moreover, in inter-forecast according to AVC, a reconstructed image frame for use in inter-forecast is designated by a reference index, and a position of a reconstructed image in the above-described designated reconstructed image frame, which position serves as a forecasted value to be generated, is designated by a motion vector mv.

The intra-forecast mode selecting apparatus P1000, which is a characteristic portion of the invention, looks up the original image stored in the MB buffer E101 and a reconstructed image stored in the frame buffer E106, and calculates a cost of the intra-forecast mode and intra MB-mode: mb_intra_cost (mb_cost as given by EQ. (8)). It will be easily recognized that the intra-forecast mode selecting apparatus P1000 of the invention can accommodate the aforementioned intra-forecast modes for a 4×4 block, and in addition, those for a 8×8 block and those for a 16×16 block.

The inter-forecast mode selecting apparatus E109 looks up the original image stored in the MB buffer E101 and the reconstructed image stored in the frame buffer E106, and calculates parameters related to inter-forecast (reference index and motion vector) and a cost (mb_inter_cost) for an inter MB-mode.

The switch SW110 compares the above-described intra MB-mode cost (mb_intra_cost) and the above-described inter MB-mode cost (mb_inter_cost), and selects an MB-mode corresponding to that having a smaller MB-mode cost value, and forecast parameters related thereto (intra-forecast mode, or reference index and motion vector) for supplying them to the forecast apparatus E107 and entropy coding apparatus E104. The above-described selected MB-mode and forecast parameters related thereto are entropy-coded by the entropy coding apparatus E104.

The forecast apparatus E107 generates a forecasted value depending upon the MB-mode and the forecast parameters related thereto supplied via the switch SW110, from the reconstructed image stored in the frame buffer E106.

From the original image stored in the MB buffer E101 is subtracted the forecasted value supplied by the forecast apparatus E107, and the result is supplied as a forecast error to the conversion apparatus E102.

The above-described forecast error is converted into a value in the frequency domain by the conversion apparatus E102. The forecast error converted into the frequency domain is quantized by the quantization apparatus E103 with a quantization step size corresponding to a quantization parameter QP supplied by the coding amount control apparatus E108. The quantization parameter QP and quantized forecast error (quantization level) are entropy-encoded by the entropy coding apparatus E104.

The above-described quantization level is subjected to inverse quantization and inverse conversion by the inverse quantization/inverse conversion apparatus E105, and brought back to its original spatial domain. The forecast error brought back to the spatial domain is added with the forecasted value supplied by the forecast apparatus E107, and the result is stored in the frame buffer E106 as a reconstructed image for subsequent encoding.

The explanation of the moving picture coding apparatus according to AVC using the intra-forecast mode selecting apparatus of the invention has now been completed.

Another Embodiment

While any one of the aforementioned embodiments may be configured in hardware as apparent from the explanation above, it is possible to implement it by a program.

Figure 12:
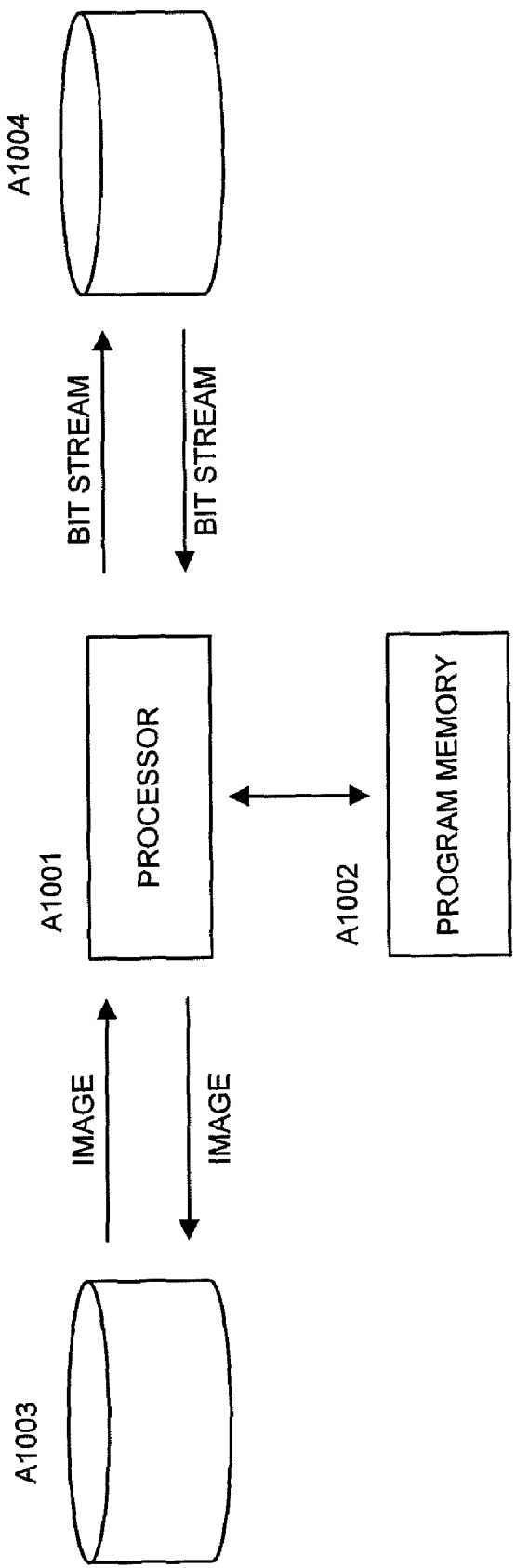
FIG. 12 shows a configuration of an information processing apparatus with which the present invention is employed.

An information processing system shown in FIG. 12 consists of a processor A1001, a program memory A1002, and storage media A1003 and A1004. The storage media A1003 and A1004 may be separate storage media, or storage regions comprised in the same storage medium. For the storage medium, a magnetic storage medium such as a hard disk may be employed.

The invention claimed is:

1. An intra-forecast mode selecting method of selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein
it is decided whether an intra-forecast mode forecasted from an intra-forecast mode of an already-encoded block adjacent to the current block is an intra-forecast mode predetermined to be selected with higher priority than the DC intra-forecast mode, and
only in a case that said forecasted intra-forecast mode is decided to be the intra-forecast mode predetermined to be selected with higher priority than the DC intra-forecast mode, a header coding amount of the DC intra-forecast mode is corrected to be no greater than those of other intra-forecast modes, and an intra-forecast mode is selected based on said corrected header coding amount of the DC intra-forecast mode, the header coding amounts of other intra-forecast modes and the forecast difference in intra-forecast.

2. An intra-forecast mode selecting method according to claim 1, wherein
after selecting an intra-forecast mode for the current block, when the selected intra-forecast mode is the DC intra-forecast mode, said corrected header coding amount of the DC intra-forecast mode is re-corrected with the header coding amount of the DC intra-forecast mode.

3. An intra-forecast mode selecting method of selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein
after a header coding amount of the DC intra-forecast mode is corrected to be no greater than those of other intra-forecast modes, and an intra-forecast mode is selected based on said corrected header coding amount of the DC intra-forecast mode, the header coding amounts of other intra-forecast modes and the forecast difference in intra-forecast, when said selected intra-forecast mode is the DC intra-forecast mode, said corrected header coding amount of the DC intra-forecast mode is re-corrected with the header coding amount of the DC intra-forecast mode.

4. A moving picture coding method using an intra-forecast mode selecting method of selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein
it is decided whether an intra-forecast mode forecasted from an intra-forecast mode of an already-encoded block adjacent to the current block is an intra-forecast mode predetermined to be selected with higher priority than the DC intra-forecast mode, and
only in a case that said forecasted intra-forecast mode is decided to be the intra-forecast mode predetermined to be selected with higher priority than the DC intra-forecast mode, a header coding amount of the DC intra-forecast mode is corrected to be no greater than those of other intra-forecast modes, and an intra-forecast mode is selected based on said corrected header coding amount of the DC intra-forecast mode, the header coding amounts of other intra-forecast modes and the forecast difference in intra-forecast.

5. A moving picture coding method according to claim 4, wherein
after selecting an intra-forecast mode for the current block, when the selected intra-forecast mode is the DC intra-forecast mode, said corrected header coding amount of the DC intra-forecast mode is re-corrected with the header coding amount of the DC intra-forecast mode.

6. A moving picture coding method using an intra-forecast mode selecting method of selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein
after a header coding amount of the DC intra-forecast mode is corrected to be no greater than those of other intra-forecast modes, and an intra-forecast mode is selected based on said corrected header coding amount of the DC intra-forecast mode, the header coding amounts of other intra-forecast modes and the forecast difference in intra-forecast, when said selected intra-forecast mode is the DC intra-forecast mode, said corrected header coding amount of the DC intra-forecast mode is re-corrected with the header coding amount of the DC intra-forecast mode.

7. An intra-forecast mode selecting apparatus for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, said apparatus comprising:
   correcting means for deciding whether an intra-forecast mode forecasted from an intra-forecast mode of an already-encoded block adjacent to the current block is an intra-forecast mode predetermined to be selected with higher priority than the DC intra-forecast mode, and only in a case that said forecasted intra-forecast mode is decided to be the intra-forecast mode predetermined to be selected with higher priority than the DC intra-forecast mode, correcting a header coding amount of the DC intra-forecast mode to be no greater than those of other intra-forecast modes; and
   intra-forecast mode selecting means for selecting an intra-forecast mode based on said corrected header coding amount of the DC intra-forecast mode, the header coding amounts of other intra-forecast modes and the forecast difference in intra-forecast.

8. An intra-forecast mode selecting apparatus according to claim 7, wherein, after selecting an intra-forecast mode for the current block, when the selected intra-forecast mode is the DC intra-forecast mode, said correcting means re-corrects said corrected header coding amount of the DC intra-forecast mode with the header coding amount of the DC intra-forecast mode.

9. An intra-forecast mode selecting apparatus for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, said apparatus comprising:
   correcting means for correcting a header coding amount of the DC intra-forecast mode is corrected to be no greater than those of other intra-forecast modes;
   intra-forecast mode selecting means for selecting an intra-forecast mode based on said corrected header coding amount of the DC intra-forecast mode, the coding amounts of other intra-forecast modes and the forecast difference in intra-forecast, and
   re-correcting means for re-correcting said corrected header coding amount of the DC intra-forecast mode with the header coding amount of the DC intra-forecast mode when said intra-forecast mode selected by said intra-forecast mode selecting means is the DC intra-forecast mode.

10. A moving picture coding apparatus comprising an intra-forecast mode selecting apparatus for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, said apparatus comprises comprising:
   correcting means for deciding whether an intra-forecast mode forecasted from an intra-forecast mode of an already-encoded block adjacent to the current block is an intra-forecast mode predetermined to be selected with higher priority than the DC intra-forecast mode, and only in a case that said forecasted intra-forecast mode is decided to be the intra-forecast mode predetermined to be selected with higher priority than the DC intra-forecast mode, correcting a header coding amount of the DC intra-forecast mode to be no greater than those of other intra-forecast modes; and
   intra-forecast mode selecting means for selecting an intra-forecast mode based on said corrected header coding amount of the DC intra-forecast mode, the header coding amounts of other intra-forecast modes and the forecast difference in intra-forecast.

11. A moving picture coding apparatus according to claim 10, wherein
   after selecting an intra-forecast mode for the current block, when the selected intra-forecast mode is the DC intra-forecast mode, said correcting means re-corrects said corrected header coding amount of the DC intra-forecast mode with the header coding amount of the DC intra-forecast mode.

12. A moving picture coding apparatus comprising an intra-forecast mode selecting apparatus for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, said apparatus comprising:
   correcting means for correcting a header coding amount of the DC intra-forecast mode to be no greater than those of other intra-forecast modes;
   intra-forecast mode selecting means for selecting an intra-forecast mode based on said corrected header coding amount of the DC intra-forecast mode, the header coding amounts of other intra-forecast modes and the forecast difference in intra-forecast; and
   re-correcting means for re-correct said corrected header coding amount of the DC intra-forecast mode with the header coding amount of the DC intra-forecast mode when said intra-forecast mode selected by said intra-forecast mode selecting means is the DC intra-forecast mode.

13. A non-transitory computer readable storage medium including a program for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein said program causes an information processing, apparatus to execute the processing of:
   deciding whether an intra-forecast mode forecasted from an intra-forecast mode of an already-encoded block adjacent to the current block is an intra-forecast mode predetermined to be selected with higher priority than the DC intra-forecast mode; and
   only in a case that said forecasted intra-forecast mode is decided to be the intra-forecast mode predetermined to be selected with higher priority than the DC intra-forecast mode, correcting a header coding amount of the DC intra-forecast mode to be no greater than those of other intra-forecast modes, and selecting an intra-forecast mode based on said corrected header coding amount of the DC intra-forecast mode, the header coding amounts of other intra-forecast modes and the forecast difference in intra-forecast.

14. The non-transitory computer readable storage medium including a program according to claim 13, wherein said program causes the information processing apparatus to execute the processing of:

after selecting an intra-forecast mode for the current block, when the selected intra-forecast mode is the DC intra-forecast mode, re-correcting said corrected header coding amount of the DC intra-forecast mode with the header coding amount of the DC intra-forecast mode.

15. A non-transitory computer readable storage medium including a program for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein said program causes an information processing apparatus to execute the processing of:

after a header coding amount of the DC intra-forecast mode is corrected to be no greater than those of other intra-forecast modes, and an intra-forecast mode is selected based on said corrected header coding amount of the DC intra-forecast mode, the header coding amounts of other intra-forecast modes and the forecast difference in intra-forecast, when said selected intra-forecast mode is the DC intra-forecast mode, re-correcting said corrected header coding amount of the DC intra-forecast mode with the header coding amount of the DC intra-forecast mode.

16. A non-transitory computer readable storage medium including a moving picture coding program for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein said program causes an information processing apparatus to execute the processing of:

deciding whether an intra-forecast mode forecasted from an intra-forecast mode of an already-encoded block adjacent to the current block is an intra-forecast mode predetermined to be selected with higher priority than the DC intra-forecast mode; and only in a case that said forecasted intra-forecast mode is decided to be the intra-forecast mode predetermined to be selected with higher priority than the DC intra-forecast mode, correcting a header coding amount of the DC intra-forecast mode to be no greater than those of other intra-forecast modes, and selecting an intra-forecast mode based on said corrected header coding amount of the DC intra-forecast mode, the header coding amounts of other intra-forecast modes and the forecast difference in intra-forecast.

17. The non-transitory computer readable storage medium including a program according to claim 16, wherein said program causes the information processing apparatus to execute the processing of, after selecting an intra-forecast mode for the current block, when the selected intra-forecast mode is the DC intra-forecast mode, re-correcting said corrected header coding amount of the DC intra-forecast mode with the header coding amount of the DC intra-forecast mode.

18. A non-transitory computer readable storage medium including a moving picture coding program for selecting an intra-forecast mode suitable for intra-forecast coding of a block to be encoded from a plurality of intra-forecast modes including a DC intra-forecast mode based on a coding amount of an intra-forecast mode and a forecast difference in intra-forecast, wherein said program causes an information processing apparatus to execute the processing of:

after a header coding amount of the DC intra-forecast mode is corrected to be no greater than those of other intra-forecast modes, and an intra-forecast mode is selected based on said corrected header coding amount of the DC intra-forecast mode, the header coding amounts of other intra-forecast modes and the forecast difference in intra-forecast, when said selected intra-forecast mode is the DC intra-forecast mode, re-correcting said corrected header coding amount of the DC intra-forecast mode with the header coding amount of the DC intra-forecast mode.

\* \* \* \* \*

UNITED STATES PATENT AND TRADEMARK OFFICE
CERTIFICATE OF CORRECTION

PATENT NO. : 8,290,064 B2  
APPLICATION NO. : 12/282338  
DATED : October 16, 2012  
INVENTOR(S) : Chono It is certified that error appears in the above-identified patent and that said Letters Patent is hereby corrected as shown below:

In the Specification

Column 3, Line 37: Delete "$= 4 \times 2^{(QP-12)/16}$" and insert -- $= 4 \times 2^{(QP-12)/6}$ --

Column 9, Line 36: Delete "$= 4 \times 2^{(QP-12)/16}$" and insert -- $= 4 \times 2^{(QP-12)/6}$ --

Column 11, Line 43: Delete "$= 4 \times 2^{(QP-12)/16}$" and insert -- $= 4 \times 2^{(QP-12)/6}$ --

In the Claims

Column 18, Line 47: Claim 13, Delete "processing," and insert -- processing --

Signed and Sealed this  
Twenty-eighth Day of October, 2014

Michelle K. Lee  
*Deputy Director of the United States Patent and Trademark Office*